US010919101B2

(12) United States Patent
Albrecht et al.

(10) Patent No.: US 10,919,101 B2
(45) Date of Patent: Feb. 16, 2021

(54) WELDING SYSTEMS AND METHODS UTILIZING CLOUD COMPUTING AND DATA STORAGE

(71) Applicant: Illinois Tool Works Inc., Glenview, IL (US)

(72) Inventors: Bruce P. Albrecht, Neenah, WI (US); Quinn William Schartner, Kaukauna, WI (US); Edward J. Panelli, Wauwatosa, WI (US)

(73) Assignee: Illinois Tool Works Inc., Glenview, IL (US)

( * ) Notice: Subject to any disclaimer, the term of this patent is extended or adjusted under 35 U.S.C. 154(b) by 278 days.

(21) Appl. No.: 15/864,541

(22) Filed: Jan. 8, 2018

(65) Prior Publication Data

US 2018/0141147 A1    May 24, 2018

Related U.S. Application Data

(63) Continuation of application No. 13/619,691, filed on Sep. 14, 2012, now Pat. No. 9,862,051.

(Continued)

(51) Int. Cl.
*B23K 9/10* (2006.01)

(52) U.S. Cl.
CPC .................. *B23K 9/1006* (2013.01)

(58) Field of Classification Search
CPC .. B23K 9/1062; B23K 9/1087; B23K 9/0953; G06Q 30/0601; G06Q 30/0641;
(Continued)

(56) References Cited

U.S. PATENT DOCUMENTS 4,825,038 A    4/1989  Smartt
6,486,439 B1   11/2002 Spear
(Continued)

FOREIGN PATENT DOCUMENTS

CA    2372764    8/2002
CN    1525896    9/2004
(Continued)

OTHER PUBLICATIONS

Canadian Office Action Appln No. 2,914,706 dated May 24, 2018 (6 pgs.).
(Continued)

*Primary Examiner* — Brian W Jennison
(74) *Attorney, Agent, or Firm* — McAndrews, Held & Malloy, Ltd.

(57) ABSTRACT

Welding systems and methods utilizing cloud computing and data storage are disclosed. An example method includes receiving, via communication circuitry of a cloud-based resource, welding data relating to a welding operation from a first customer; storing the welding data in computer-readable storage media associated with the cloud-based resource; offering the welding data for sale, via the cloud based resource; receiving, via the communication circuitry, an offer for the welding data from a second customer, different from the first customer, wherein the first and second customers are individual welders, factories, distributed manufacturing operations, or a combination thereof; performing a financial transaction with the second customer; and transmitting, via the communication circuitry, the welding data to the second customer.

19 Claims, 5 Drawing Sheets

Related U.S. Application Data

(60) Provisional application No. 61/539,762, filed on Sep. 27, 2011.

(58) Field of Classification Search
CPC ........ G06Q 30/06; G06Q 20/06; G06Q 20/08; G06Q 20/123
See application file for complete search history.

(56) References Cited

U.S. PATENT DOCUMENTS

| | | | |
|---|---|---|---|
| 6,624,388 B1 | 9/2003 | Blankenship | |
| 6,636,776 B1 | 10/2003 | Barton | |
| 6,797,921 B1 | 9/2004 | Niedereder | |
| 6,809,292 B2 | 10/2004 | Spear | |
| 6,858,817 B2 | 2/2005 | Blankenship | |
| 6,924,459 B2 | 8/2005 | Spear | |
| 7,041,936 B2 | 5/2006 | Oberzaucher | |
| 7,643,890 B1 | 1/2010 | Hillen | |
| 7,908,302 B1 | 3/2011 | Nagaralu | |
| 2003/0145006 A1 | 7/2003 | Dalfsen | |
| 2004/0099648 A1 | 5/2004 | Hu | |
| 2004/0262279 A1* | 12/2004 | Spear | B23K 9/1062 219/130.5 |
| 2005/0133488 A1 | 6/2005 | Blankenship | |
| 2008/0078811 A1 | 4/2008 | Hillen | |
| 2008/0149686 A1 | 6/2008 | Daniel | |
| 2009/0173726 A1 | 7/2009 | Davidson | |
| 2009/0234483 A1 | 9/2009 | Leko | |
| 2009/0259564 A1* | 10/2009 | Barkerding | G06Q 20/12 705/26.1 |
| 2009/0313549 A1 | 12/2009 | Casner | |
| 2009/0327035 A1* | 12/2009 | Allard | G06Q 10/00 705/7.29 |
| 2010/0224610 A1 | 9/2010 | Wallace | |
| 2010/0257228 A1 | 10/2010 | Staggs | |
| 2010/0299185 A1 | 11/2010 | Caro | |
| 2010/0304714 A1* | 12/2010 | Chao | G06Q 20/12 455/411 |
| 2011/0066526 A1* | 3/2011 | Watson | G06Q 20/12 705/27.2 |
| 2011/0114615 A1 | 5/2011 | Daniel | |
| 2011/0117527 A1 | 5/2011 | Conrardy | |
| 2011/0131591 A1* | 6/2011 | Henderson | G06F 21/105 720/600 |
| 2011/0172796 A1 | 7/2011 | Sohmshetty | |
| 2012/0136692 A1 | 5/2012 | Ohishi | |
| 2012/0193330 A1 | 8/2012 | Edwards | |
| 2012/0226478 A1 | 9/2012 | Bender | |
| 2013/0075380 A1 | 3/2013 | Albrech | |
| 2014/0277684 A1 | 9/2014 | Lamers | |
| 2014/0278242 A1 | 9/2014 | Lamers | |
| 2014/0278243 A1 | 9/2014 | Lamers | |
| 2015/0012865 A1 | 1/2015 | Lamers | |
| 2015/0019594 A1 | 1/2015 | Lamers | |
| 2015/0121309 A1 | 4/2015 | Reed | |

FOREIGN PATENT DOCUMENTS

| | | |
|---|---|---|
| CN | 1778990 | 5/2006 |
| CN | 101978389 | 2/2011 |
| CN | 102922089 | 2/2013 |
| CN | 202870885 | 4/2013 |
| EP | 1295673 A1 | 3/2003 |
| EP | 1958738 | 8/2008 |
| EP | 3017388 | 5/2016 |
| GB | 2454232 A | 5/2009 |
| JP | H1147950 | 2/1999 |
| JP | 2003211378 A | 7/2003 |
| KR | 20120017189 | 2/2012 |
| WO | 02058878 A1 | 8/2002 |
| WO | 2012000650 | 1/2012 |
| WO | 2015002949 A3 | 1/2015 |

OTHER PUBLICATIONS

Canadian Office Action Appln No. 2,914,706 dated Feb. 6, 2019 (6 pgs.).
Canadian Office Action Appln No. 2,914,706 dated Feb. 12, 2019 (6 pgs.).
Canadian Office Action Appln No. 2,847,194 dated Mar. 5, 2018 (4 pgs.).
'How to Measure Performance—A Handbook of Techniques and Tools,' U.S. Department of Energy, Oct. 1, 1995, http://www.orau.gov/pbm/handbook/handbook_all.pdf.
Gilsinn, Jim et al.: "A Welding Cell That Supports Remote Collaboration", Ninth International Conference on Computer Technology in Welding, Sep. 30, 1999.
International Search Report from PCT application No. PCT/US2014/045049, dated Jan. 29, 2015, 9 pgs.
International Search Report from PCT application No. PCT/US2012/057064 dated Dec. 21, 2012, 13 pgs.
International Search Report from PCT application No. PCT/US2014/017862 dated May 8, 2014, 13 pgs.
International Search Report from PCT application No. PCT/US2014/017863 dated May 12, 2014, 21 pgs.
International Search Report from PCT application No. PCT/US2014/020920 dated May 12, 2014, 11 pgs.
International Search Report from PCT application No. PCT/US2014/045047, dated Jun. 3, 2015, 15 pgs.

* cited by examiner

WELDING SYSTEMS AND METHODS UTILIZING CLOUD COMPUTING AND DATA STORAGE

RELATED APPLICATIONS

This patent is a continuation of U.S. patent application Ser. No. 13/619,691, filed Sep. 14, 2012, entitled "WELDING SYSTEM AND METHOD UTILIZING CLOUD COMPUTING AND DATA STORAGE," which claims priority to U.S. Patent Application Ser. No. 61/539,762, filed Sep. 27, 2011, entitled "WELDING SYSTEM AND METHOD UTILIZING CLOUD COMPUTING AND DATA STORAGE." The entireties of U.S. patent application Ser. No. 13/619,691 and U.S. Patent Application Ser. No. 61/539,762 are incorporated herein by reference.

BACKGROUND

This disclosure relates generally to the field of welding systems and processes, and more particularly to arrangements that make use of cloud-based resources for facilitating and supporting welding operations.

SUMMARY

The present disclosure offers approaches to welding operations that are based upon use of cloud technologies for the provision of services and products to welding systems and enterprises utilizing such systems. It is believed that the provision of such services and products by cloud-based, offsite, and third party providers will represent an important step change in the way welding and welding-based production processes operate.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
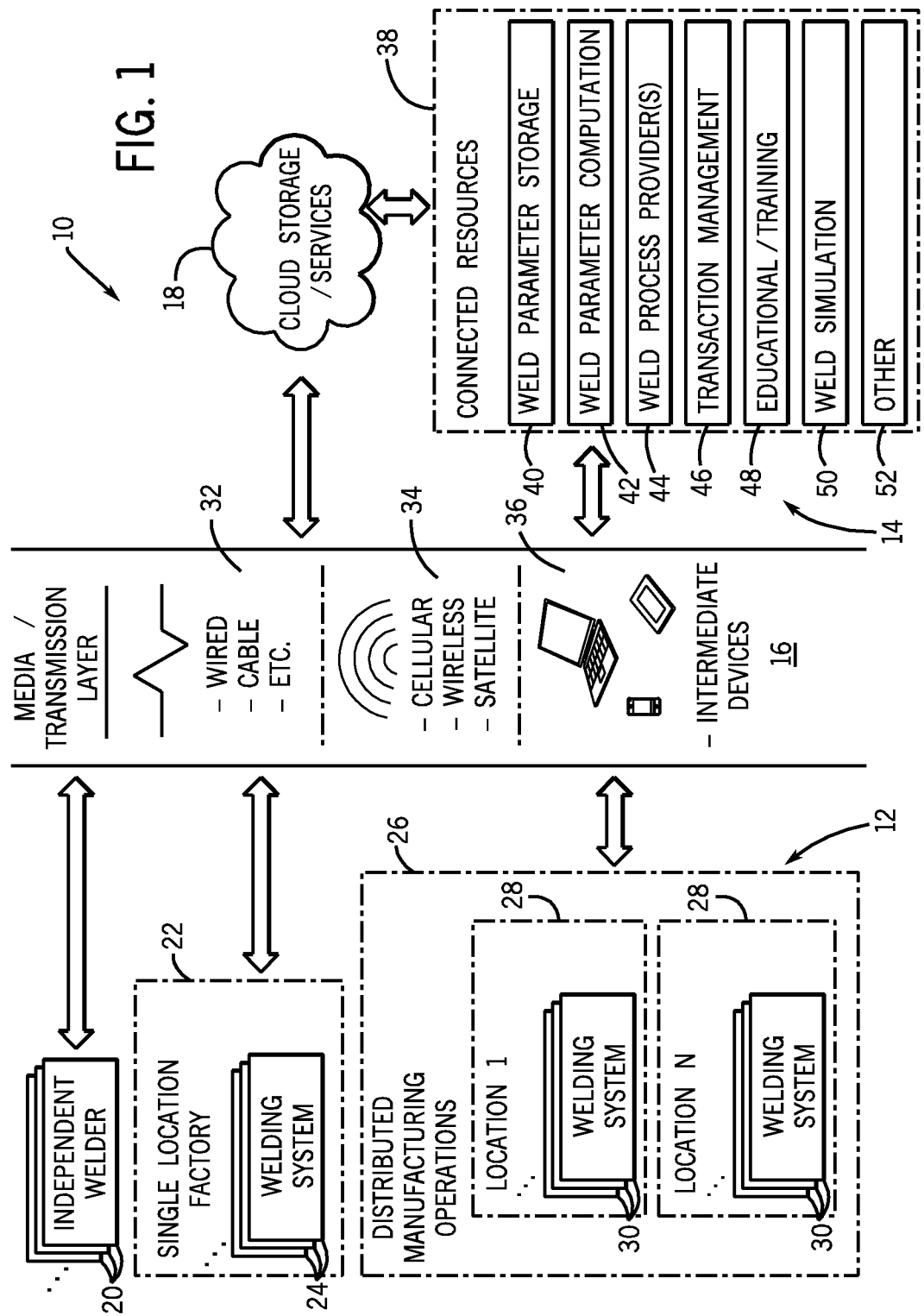
FIG. 1 is a diagrammatical representation of a cloud-based welding system in accordance with aspects of the present disclosure.

FIG. 1 illustrates an exemplary cloud-based welding system 10 in accordance with aspects of the present disclosure. The system may include and service a wide range of welding systems and welding infrastructures, referred to generally as a welding community 12. The system also includes a supply/service community 14 that may provide services and products to the welding community as disclosed below. The welding community and the supply/service community communicate a media/transmission layer 16 and a cloud 18 as described below.

As used herein, the term "cloud" may refer to various evolving arrangements, infrastructure, networks, and the like that will typically be based upon the Internet. The term may refer to any type of cloud, including a client clouds, application clouds, platform clouds, infrastructure clouds, server clouds, and so forth. As will be appreciated by those skilled in the art, such arrangements will generally allow for third party entities to receive and store data related to welding applications, transmit data to welders and entities in the welding community for welding applications, provide software as a service (SaaS), provide various aspects of computing platforms as a service (PaaS), provide various network infrastructures as a service (IaaS) and so forth. Moreover, included in this term should be various types and business arrangements for these products and services, including public clouds, community clouds, hybrid clouds, and private clouds. Any or all of these may be serviced by a third party entities. Moreover, servicing by third party entities is particularly attractive in many contexts because resources discussed below can provide products and services that are otherwise unavailable to the welding community. However, in certain embodiments, particularly large entities with distributed manufacturing operations, private clouds or hybrid clouds may be attractive to allow for sharing of welding-relating product and services across the enterprise.

Returning to FIG. 1, the welding community 12 is illustrated as including independent welders 20. These independent welders may employ various types of welding systems, both fixed and mobile. In general, they will operate independently of a factory or organization, or in small groups to provide welding services. The community also includes entities having single factory locations as indicated by reference numeral 22. Such manufacturing operations will use one or more welding systems 24 that may, within the organization, be linked by one or more networks. Still further, the welding community may include larger entities having distributed manufacturing operations as indicated by reference numeral 26. In these organizations multiple different locations 28 may utilize one or more welding systems 30. Here the locations may operate independently or may be linked by internal or hybrid networks. In all of these settings, the cloud-based arrangement illustrated in FIG. 1 allows for various products and services to be offered that enhance productivity, improved quality and consistency, and allow for greater flexibility in welding preparation and performance.

The various participants in the welding community 12 communicate through the media/transmission layer 16 which would generally allow for two-way communication of a wide range of data, processes, services, products, and so forth. FIG. 1 illustrates a number of different technologies and platforms that may be used for such communication. One class of technologies includes various wired connections as indicated generally by reference numeral 32. These may be conventional telephony systems, cable systems, hardware-based Internet communications systems, including routers, servers, gateways, and any other hardware, software, and firmware required with such communications. Other technologies, indicated by reference numeral 34, are wireless in nature, including cellular communications, various wireless protocols, satellite communication, near field communication (NFC), and so forth. As indicated by reference numeral 36, the media/transmission layer may also include various intermediate devices, such as desktop and portable computers, hand-held computing devices, cellular and smart telephones, and so forth. Moreover, communications, processing and data exchange techniques employed may by any of the components of the welding system may incorporate technologies such as those described in U.S. Pat. No. 6,478,792, issued to Beiermann et al. on Nov. 12, 2002, which is hereby incorporated into the present disclosure by reference The welding community may communicate with the service/supply community 14 via the cloud 18. The supply/service community 14 will generally include various connected resources 38 that can place information in the cloud, draw information from the cloud, and provide goods and services through the intermediary of the cloud. In general, many of these resources will also be able to communicate through direct interaction with the welding community where desired. Moreover, some or all of these connected resources may themselves provide cloud services, such as to store information, retrieve information, translate specifications, execute transactions, and so forth on the computing resources of the entities themselves. In other contexts, the connected resources will be separate from the entities that establish and maintain the cloud.

In the embodiment illustrated in FIG. 1, the connected resources 38 include services for weld parameter storage 40, weld parameter computation 42 and weld process providers 44. As will be appreciated by those skilled in the art, complex welding operations typically result in monitoring and often in storage of a vast array of parameters of interest before, during and after the welding operation. Thus, the parameter storage, computation and process resources allow for cloud-based provision and support of such information. By way of example only, typical welding operations may monitor currents, voltages, wire feed rates, travel speeds, weld characteristics, materials utilized, welding personnel and hardware involved for a particular workpieces, workpiece identification information (workpiece product and serial numbers, etc.), among other information. The weld parameter computation resources may allow for translation of certain information into weld profiles, such as from computer aided design and drawing specifications, product specifications, and the like. The weld processes relate to the various control regime that can be carried out by the welding systems in the welding community. These might include, for example, metal inert gas (MIG), welding routines, stick welding routines, tungsten inert gas (TIG), welding regimes, submerged arc welding regimes, and so forth. Within each of these types of welding, a wide range of processes may be available that may be selected based upon such factors as the workpiece and workpiece materials involved, the orientation of welds to be completed, the engineering specifications for a particular project, and so forth. Such processes may be for example, constant current processes, constant voltage processes, pulsed welding processes, short circuit processes, spray processes, to mention only a few. Moreover, various techniques are known for detecting, monitoring and logging welding parameters, such as techniques set forth in U.S. provisional patent application 61/636,292, filed by Holverson et al. on Apr. 20, 2012, which is hereby incorporated into the present disclosure by reference.

The connected resources 38 may further include transaction management resources 46 designed to allow for and facilitate the purchase, rent, or any other use of the cloud resources and product and services offered through the cloud. In certain contexts described below, this transaction management may allow for browsing and selection of various services and processes, with financial transactions ensuing based upon selection by a welder or enterprise. For example, this may include automated consumable replenishment from a supplier, such as via vendor managed inventory (VMI) systems. Still further, the resource may include the education and training and resources, such as for initially educating beginning and intermediate welders and for maintaining a knowledge base with more experienced personnel. These educational resources 48 may include online training resources, streaming resources, books and videos, and any other materials desired. The connected resources may further allow for weld simulation as indicated by reference numeral 50. These resources may again permit certain training to be done for new personnel or for new processes to be utilized by experienced welders. The weld simulation provided may make use, in certain applications, of particular hardware and routines, such as welding helmets designed for simulation, computer monitors designed to allow for such simulation, and these services may be provided as a product, streamed, or may be interactive. A range of other connected resources may support or be available through the cloud 18 as indicated by reference numeral 52. It is believed that once in place and familiar to the welding community, many such resources will desire to utilize the flexibility of the cloud.

Figure 2:
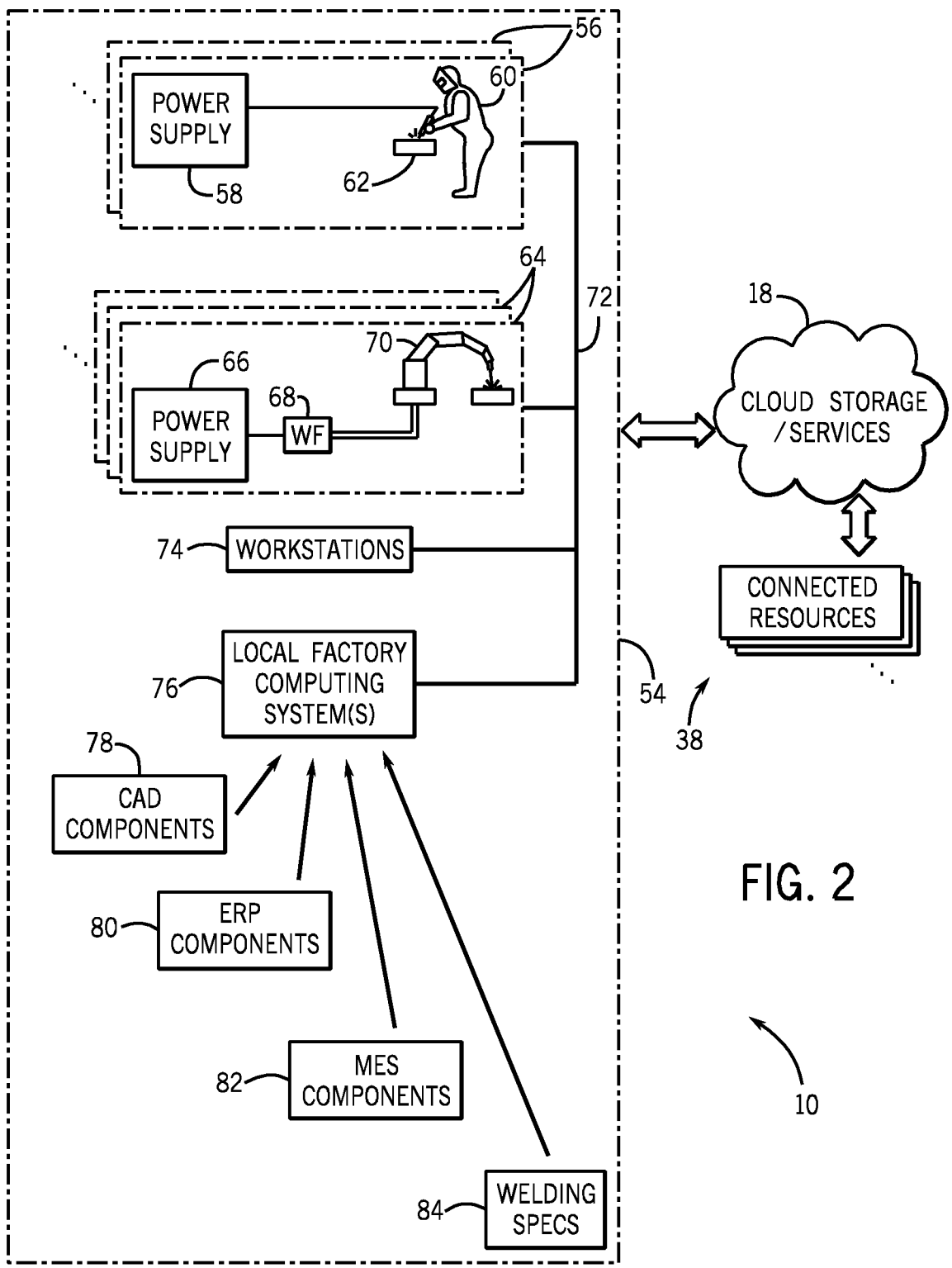
FIG. 2 is a diagrammatical representation of a cloud-based system illustrating certain details of welding systems and infrastructure that may be included on a client side.

FIG. 2 illustrates the cloud-based welding system 10 showing an exemplary manufacturing enterprise 54 in somewhat greater detail. Such enterprises may include a range of welding systems, welding locations, welding applications, production lines, weld cells, and so forth, some or all of which may connected by an internal network. In the illustration of FIG. 2, for example, a plurality of weld cells or locations 56 are provided for manual welding. Each weld cell will be provided with a power supply 58 that executes welding routines and produces power designed for particular welding operation. A welder 60 utilizes the power supply, typically through a cabled connection to a welding torch which, in most manual applications will be handheld. Depending upon the process utilized and the welding system design (e.g., TIG, MIG, stick, etc.), the welder executes welds on workpieces 62 that may be fixture in various ways to facilitate the production process.

The manufacturing enterprise 54 may further include automated welding stations as indicated by reference numeral 64. In some installations these may be part of production lines where workpieces progress through for subsequent assembly steps. In other applications, the workpieces may be static and equipment deployed for executed welds at specific locations. In the illustrated embodiment, the automated welding stations each comprise a power supply 66 and a wire feeder 68. As will be appreciated by those skilled in the art, such equipment is typically designed for MIG welding via one or more robots 70 that carry out pre-defined welding protocols.

While illustrated as weld cells and automated welding stations in FIG. 2, it should be appreciated that a wide range of welding setups may be accommodated by the cloud-based welding system. For example, in large industrial installations, such as power plants, shipyards, constructions sites, and so forth, welders will typically move around the equipment at the job site, but may nevertheless be in communication with cloud-based connected resources 38 by means of wired and wireless connections as described above.

Again in the embodiment illustrated in FIG. 2, the weld cells 56 and the automated welding stations 64 are connected to a network 72, such as a wired local area network (LAN), wireless LAN, or any other suitable network technology or protocol. Such enterprises will typically include workstations 74 that allow welding technicians, engineers, and other enterprise personnel to monitor productivity and quality, provide resources and scheduling, upload and download welding specifications, and so forth. Also connected to the network will typically be a local factory computing system 76. Such systems will typically include one or more servers capable of storing a wide range of welding and product-related data. In the illustrated embodiment, for example, the factory computing system supports computer aided design (CAD) components 78, enterprise resource planning (ERP) components 80, manufacturing execution system (MES) or shop floor control components 82 (such as supervisory control and data acquisition (SCADA) systems), weld specification components 84, and any other software or system components that may be desired. As will be appreciated by those skilled in the art, the CAD components allow for the design, modification and specification of parts, fixtures, and so forth. The ERP components allow for human resource, welding supply, materials, and other planning and scheduling. The IVIES components may facilitate actual production processes on the factory floor, while welding specification components may be used to define welding procedures, processes, protocols, specifications for individual welds on workpieces, and so forth. All of these packages may be utilized by the local factory computing system, any one of the workstations, and by the welding systems that form part of the enterprise. In general, these support components will facilitate the welding operations, from planning, execution and monitoring points of view.

In certain embodiments, wireless communications may be employed for performing at least some of the control, monitoring, and data exchange functionality within a welding system, between welding systems, and between systems and external components and networks, including the cloud, such as techniques set forth in U.S. provisional patent application 61/684,497, filed by Dina et al. on Aug. 17, 2012, which is hereby incorporated into the present disclosure by reference. It should also be noted that various techniques may be employed for monitoring welding processes and performance within work areas and well cells, such as techniques set forth in U.S. patent application Ser. No. 13/253,231, filed by Holverson et al. on Apr. 12, 2012, which is hereby incorporated into the present disclosure by reference.

It is contemplated that any or all of these systems and functions may be supported by the cloud storage/services 18 and the connected resources 38. For example, as described below, prior to execution of welding-related production, these resources may aide in the design of parts and welding setups, the definition of welds from part specifications, scheduling of materials and personnel, and so forth. During welding operations, a myriad of data is typically collected by the welding systems, and this may be at least partially stored by the connected resources defining the cloud. These may include, for example, welding processes, part identifications, welds executed on particular parts, production rates, personnel who executed particular welds on particular parts, welding parameters, and so forth. Following welding operations, the resources may be used to evaluate performance, track quality, adjust specifications and welding parameters, financial and cost performance, and so forth. In certain embodiments, this may include advanced analytics of the welding process, such as computing the amount of spatter produced or detecting porosity of the weld.

Figure 3:
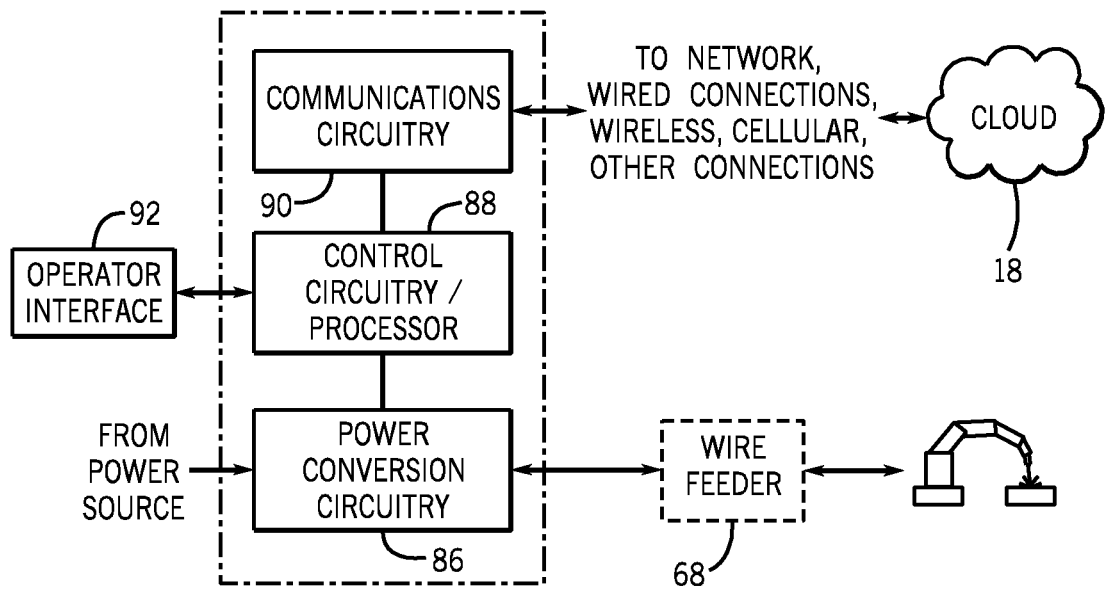
FIG. 3 is a diagrammatical representation of an exemplary welding system illustrating communications circuitry for exchanging data with external resources via the cloud.
Figure 4:
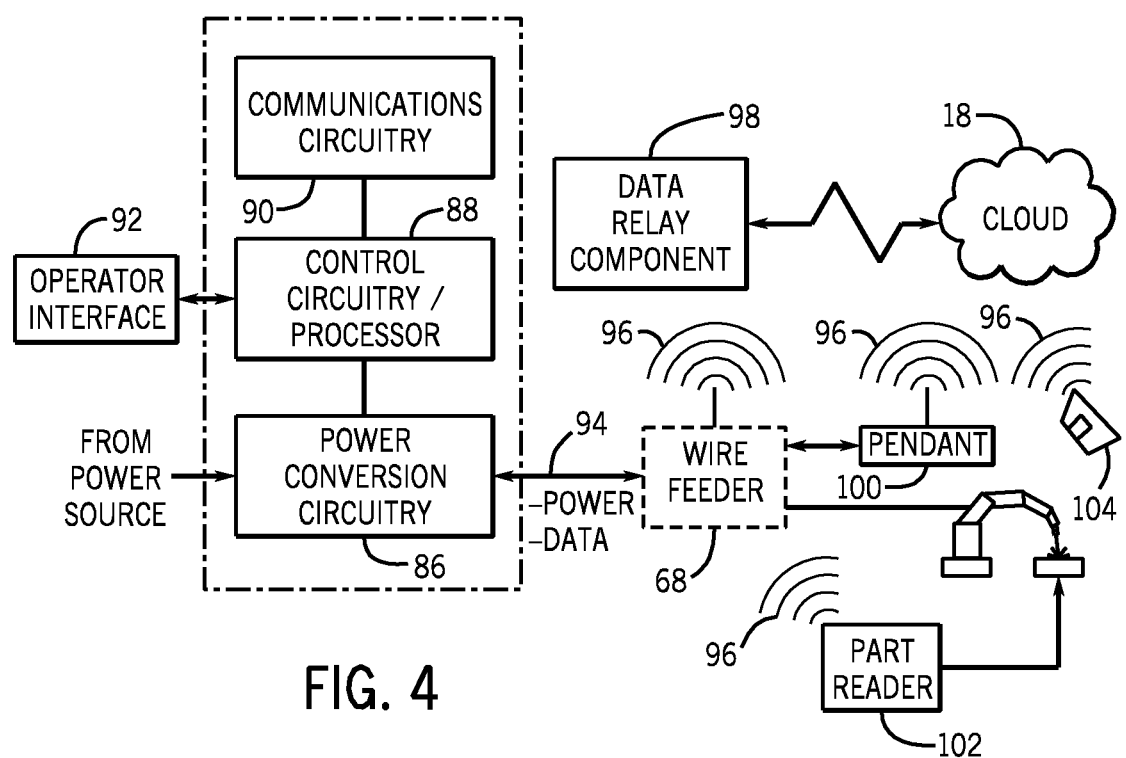
FIG. 4 is a similar diagrammatical representation of a welding system having multiple optional mechanisms for exchanging data.
Figure 5:
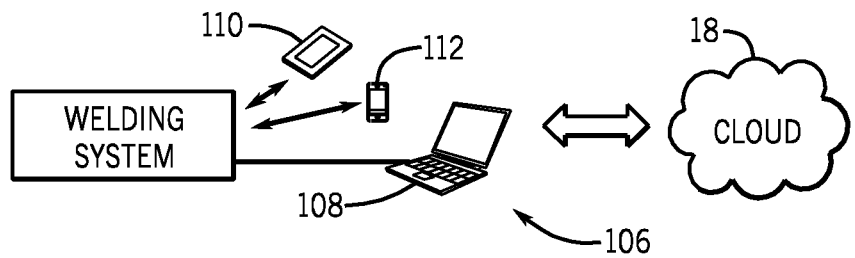
FIG. 5 is a further diagrammatical representation of a welding system that can communicate with cloud-based resources via the intermediary of various peripheral devices.

As noted above, various scenarios may be envisaged, and various technologies may be used for communicating data to and from welding systems and the cloud-based resources. FIGS. 3, 4 and 5 illustrate several exemplary scenarios for such communication. As shown in FIG. 3, a typical welding system will include power conversion circuitry 86 that receives power from a power source, such as the grid, and converts the power to a form designed for a particular welding process. The power conversion circuitry is controlled by control circuitry/processor 88 that includes associated memory for storing processes, operator and automatically-set parameters and weld settings, and so forth. Communications circuitry 90 is also associated with the control circuitry/processor 88 and allows for communication to and from the welding system. As noted above, such communications may be based on wired or wireless connections. In most applications an operator interface 92 will be provided that allows an operator to set certain welding processes, process parameters (e.g., wirefeed speeds, currents, voltages, power levels, etc.), and to see the settings on a visual feedback screen. In the embodiment illustrated in FIG. 3, a wirefeeder 68 may be provided where the process calls for such material to be fed to a welding torch. In other processes, such as tape welding, no such components will be part of the system, at least during the times that these processes are carried out. The communications circuitry 90 is adapted to communicate either directly or through an enterprise network with the cloud 18. Additional welding-specific fleet management server "appliances" may be deployed to manage some of the welding resources and communicate with the cloud. This connection may take any suitable form, as mentioned above, and may utilize any desired protocol. Such protocols may include, for example, Internet, WiFi protocols, cellular protocols, industrial data exchange protocols (e.g., DeviceNet), and so forth.

FIG. 4 illustrates similar welding system components, but with a range of different scenarios for communicating information to and from the welding system and to and from the cloud. In this illustration, the power conversion circuitry is adapted to communicate power and superimposed data via a weld cable 94. This technology allows for modulation of data over the weld signals themselves, and demodulation at other components, such as a wirefeeder 68. The wirefeeder itself may also be adapted to communicate back to the power supply in the same way. In this embodiment the wirefeeder is equipped with communications circuitry that allows for transmission of data to the cloud, as indicated by reference numeral 96, and for receipt of information from the cloud. Although not separately illustrated, the power supply may be equipped with similar communication capabilities. In the illustrated embodiment a data relay component 98, such as for a wireless LAN, receives signals from the wirefeeder (and/or the power supply) and transmits data to the cloud-based resources, and back to these components as desired. Also illustrated in FIG. 4, other components of the system may include, for example, a pendant 100 which is adapted to allow remote control of certain aspects of the welding process (e.g., the process itself, voltage settings, current settings, etc.). In such cases, the pendant may be adapted for communication to a data relay component in a similar manner. Still further, other components of the system such as a part reader 102 may similarly communicate data with cloud-based resources via a data collection component. Other monitoring components may include wired or wireless sensors for detecting gas flow, actual WFS, tool activity (e.g. grinders), and presence (e.g. light curtains, proximity sensors, presence sensing mats). In the illustrated embodiment the part reader 102 is adapted to detect barcodes, radio frequency identification tags, or any other identifying information of the part and to communicate such information for monitoring, storing, and even for receipt of appropriate weld process and weld settings information. Still further, other components of the system that may communicate in a similar way are a welding mask or helmet 104. The communication to and from the welding helmet may include, for example, operator-initiated communications, voice and video communications, and so forth.

FIG. 5 illustrates a further scenario for communication between the welding system and cloud. In this scenario various peripheral devices may be used as intermediaries for the communication, or to initiate communications themselves, such as through keypads, touch screens, voice commands, and so forth. In the illustrated embodiment, these might include a laptop computer 108, various tablet or handheld computers 110, and cellular telephones 112. Here again, these devices may be adapted for wired or wireless communication with the welding system, or may be used to input information directly, such as weld processes, weld settings, operator identifications, materials and workpiece identifications, and so forth. It is also contemplated that one or more such devices could be used as an interface on the welding system, such as an interface that could be snapped in place on the welding system, and removed for hand-held local or remote control.

It should be noted that in many of the scenarios presently envisaged, the welding equipment, or a peripheral device in communication with the equipment, may be in communication with the cloud during welding operations. However, such connectivity is not necessarily required. That is, the welding equipment may be utilized for short or extended periods when not connected or connectable to the cloud, and data exchanged with the cloud may be pushed or pulled by the welding system, or any connected peripheral device prior to or after welding takes place, when connectivity becomes available.

Figure 6:
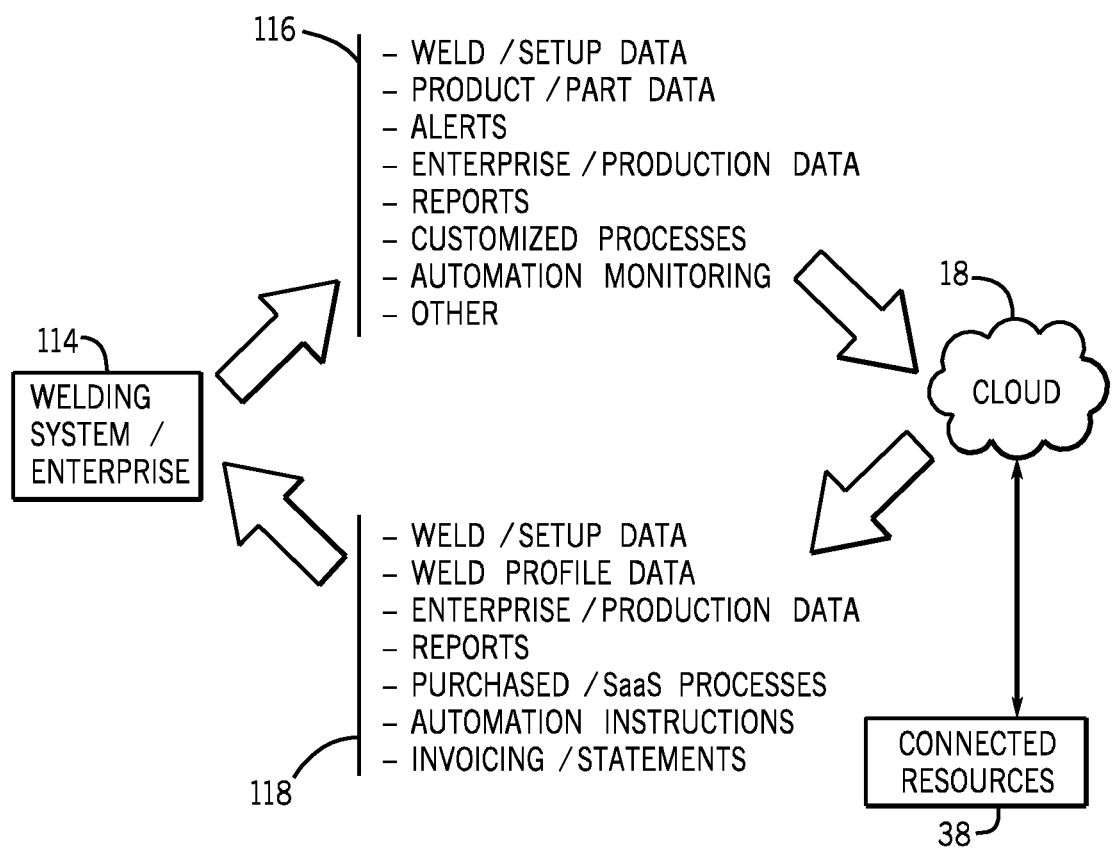
FIG. 6 is a diagrammatical representation of typical data that might be exchanged between a welding system or enterprise and cloud-based resources.

As noted above, a wide range of data may be transmitted to and from the welding system and the cloud-based connected resources. FIG. 6 illustrates certain exemplary information that may be exchanged in this way. As illustrated in FIG. 6, a welding system or enterprise 114 may communicate a wide range of data to the connected resources 38 via the cloud 18. Moreover, as discussed above, many of the resources 38 may actually define the cloud, and provide the cloud-based storage, infrastructure, data exchange, services, and other functionality described herein. Various information that may be communicated from the welding system/enterprise 114 are enumerated and indicated by reference numeral 116. In this example, data that may be returned to the welding system/enterprise is indicated by reference numeral 118. It should always be borne in mind, however, that his information is merely considered to be indicative and is in no way limiting.

Among the information that is contemplated to be provided to the cloud from the welding system/enterprise 114 is weld and setup data, particularly data defining welds to be performed on particular workpieces for particular customers at particular times, and the setups of the machines used to perform the weld. This information may include settings of the welding systems, but also materials, conditions under which welds are executed, personnel that execute the welds, automated equipment that executes the welds, and so forth. Similarly, product and part data may be provided and this may be exported in the form of design specifications, drawings, part and weld profile data files, and so forth. In the same way, alerts that occur during welding processes may be provided, and these may be associated with particular times, parts, welding processes, operators, locations, and so forth. Enterprise and production data may also be provided and stored or evaluated by the cloud-based connected resources. This information can range from production data for individual operators and equipment, but may also allow for evaluation of welding teams, production departments and facilities, production lines, and so forth. Similarly, reports may be provided that include all of this information or part of the information as desired by the enterprise. These reports maybe used by connected resources for assisting and evaluating enterprise performance or the performance of any subdivision of an enterprise.

In many welding applications, customized processes may be required to adapt an existing welding process to a particular part, a part orientation, a production location, and so forth. Such customized processes can be extremely time consuming to set up, and may be transmitted to the cloud for storage, sharing with other locations, and so forth. Similarly, automation monitoring information may be provided where automated welding is performed. As noted above, a vast array of other information could be provided by the welding system/enterprise 114 for storage, sharing, evaluation, and so forth by the connected resources. Welding machine diagnostic and sensor data (e.g. thermistors, motor current) may be passed to the cloud to enable remote service and diagnostics of machines. Bi-direction communication with the cloud enables remote firmware updating and additional service/maintenance procedures (e.g. preventative/predictive maintenance).

Among the data that may be provided from the cloud to the welding system/enterprise are weld and setup data as discussed above, weld profile data defining particular welds to be executed, enterprise and production data, reports, and so forth. Moreover, it is presently contemplated that the connected resources may offer processes, software, training, and other product and services in an SaaS scenario. By way of example, the enterprise or welding system may have a need for a particular welding process that is not present on a welding system or within the enterprise, or is not licensed for use. Such welding processes and licenses may be provided in a transaction accommodated by the cloud. One such scenario for carrying on such transactions is described below. Still further, the information provided may include automation instructions, typically translated from definitions of parts, locations and profiles of welds to be executed on the parts, instructions adapted for particular robots and setups, and so forth. Finally, various financial information may be transmitted, such as invoices, statements, and so forth. This will often be the case for welding systems and enterprises that use the cloud-based resources on a paid basis, or that license or purchase products and services in a financial transaction via the cloud (including, for example, VMI systems for consumable replenishment).

In one presently contemplated embodiment, for example, hardware, firmware and software information relating to particular welding setups may be transmitted and/or stored in the cloud. The information may be based upon one or more such items that has been purchased by a cloud-based resource, and used to provide for backup (e.g., in the event a system part is replaced and reconfiguration or reprogramming is required). Moreover the cloud-based resource may offer tracking services, such as for updates or changes that may be useful or required by the welding equipment. In a particularly useful scenario, customization of a welding system, which can be tedious and time-consuming to reproduce, may be stored by the cloud-based resource, and used when needed for programming the same or a different welding system.

In other embodiments, the overall system may allow for uploading, storing, retrieving, and editing weld profiles, cross section data and so forth to a server located in a location remote to the welding operation (i.e., in the cloud). Similar uploading, storing, retrieving and editing of weld parameter data may be performed, such as electrical parameters (e.g., voltages, currents, wire feed speeds, travel speeds, etc.). The cloud-based resources may provide a centralized location to store customer unique or customized weld profiles, which can be accessed and managed by a third party provider or particular large end-user for developing unique parameters and sharing from plant to plant (e.g., as "favorites"). Moreover, graphical user interfaces, such as on handheld devices, may be used to download programs from the cloud to the welding system or machine. Graphical user interfaces may use, as mentioned above, WiFi protocols, telephony protocols, or any other data transmission approaches.

As mentioned above, various CAD support scenarios may be envisaged in certain embodiments. For example, interfaces and welding systems may comprise or enable adaptable weld profiles from the cloud, fed by CAD systems. CAD drawings of the weld cross section or profile may be modified by the end user on the graphical user interface, then converted by a cloud-based resource into weld parameters such as electrical parameters (e.g., voltages and currents), wire feed speeds, travel speeds, and the like. Moreover, the interfaces or systems may interact with the cloud-based resources to store weld parameters such as electrical parameters, wire feed speeds, travel speeds, and so forth, regardless of the CAD weld cross section or profile. Where CAD drawings are analyzed, neural networks or other computing approaches may be used in the cloud to convert weld cross sections into recommended weld parameters.

Where CAD technologies are utilized, weld profiles and cross sections may be modified by operations such as clicking and dragging on a graphical user interface, and when desired, identifying a weld process (e.g., a pulsed process, a MIG process, a laser/hybrid MIG process, SMAW, MIG, and so forth). A computation may then be made, such as by a cloud-based resource, utilizing proprietary algorithms of the resource (e.g., a third party provider), which fit the weld type to the joint configuration as device in the CAD file or drawing. This computation or fitting would generate weld parameters or settings traditionally used to command a welding system, such as currents, voltages, wire and travel speeds, and so forth. The CAD drawings or files may be provided by end users, a service provider, or third party vendors.

In other scenarios, the cloud-based system may be integrated into the manufacturing plant. For example, such systems may use ERP and other offerings of third parties or cloud-based resources. In such as system, the operation of the welding system would be in communication with the ERP system, which could identify parts to be welded as they come into a weld cell or location, load the correct welding profile or weld parameters. Such a system could also coordinate welding operations worldwide for customers who operate as multiple locations, as discussed above.

Any desired information may be stored, provided or transferred by the use of such cloud-based systems. For example, it is presently contemplated that welding protocols may be shared and provided, as described herein. Similarly, collected data may be stored and accessed for evaluation of welding or production performance. Documentation desired or required for production may be similarly stored and accessed via the cloud, such as weld procedure specifications (WPS's), procedure qualification records (PQR's), operator qualifications, wire and resource records and history, and so forth. Where desired, some or all of these may be referenced for specific welds, workpieces or production runs.

As noted above, particular cloud customers may load information to the cloud-based resource, such as to build a library maintained by a third party cloud-based resource. Access to the library could be over and between large areas and enterprises. Such libraries may be user-configurable, such as to set up preferred menus, preferred processes and settings, and so forth. Moreover, here again, such users may share their weld profiles and/or weld parameters with subsidiaries, partners, suppliers, and so forth. Authorization to such libraries may be controlled, for example, by customer-specific authorizations.

Figure 7:
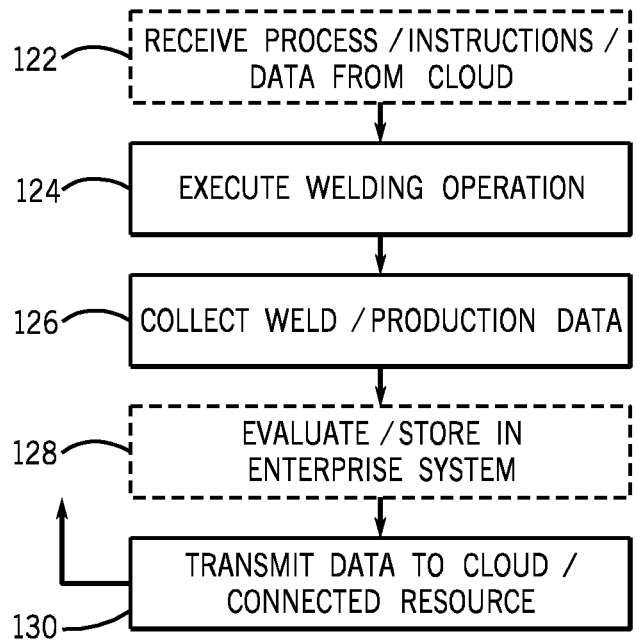
FIG. 7 is a flow chart illustrating exemplary logic for performing welding operations based upon information sent to or received from cloud-based resources.

FIG. 7 illustrates steps in exemplary logic for a typical welding operation that is performed in cooperation with cloud-based resources. The operation 120 may begin with receiving process information, instructions, or any other data from cloud as indicated at step 122. Again, this data transmission can occur in accordance with any desired protocol and may utilize various technologies for data links and transmissions. The processes, instructions, and data, when received in this manner may be received directly at the welding system, or by a device capable of communicating this information to the welding system. At step 124, then, an operator or machine executes the welding operation in a conventional manner based upon a set process, set instructions, weld settings, and so forth. During the welding process weld and production data is collected as indicated at step 126. In conventional settings, this data may be collected by the welding system and/or by components coupled to the welding system, such as support computers, network computers, and so forth. Optionally, at step 128, an enterprise may locally store and evaluate the weld information. At step 130, however, it will be possible for the collected and/or analyzed data to be provided to a cloud-connected resource for storage, further evaluation, sharing with other enterprises or departments within an enterprise, and so forth.

Figure 8:
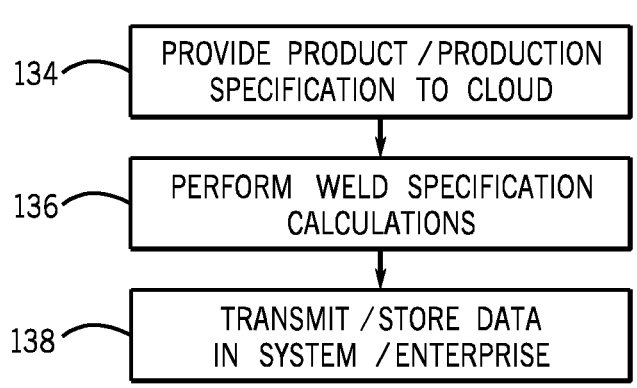
FIG. 8 is a flow chart illustrating exemplary logic for performing welding operations based upon specifications received from cloud-based resources.

FIG. 8 illustrates exemplary steps for using cloud-based resources for specification of weld profiles and settings. In this exemplary operation, indicated generally by reference numeral 32, product/production specifications may be provided to cloud-based resources as indicated by reference numeral 34. These may be provided in the form of data or databases, but may also be provided in the form of production goals and targets, available resources, CAD, drawings, and so forth. The cloud-based resource, then, may analyze this data to perform weld specification calculations as indicated at reference numeral 136. These calculations may determine, for example, preferred materials, preferred processes, preferred weld settings, production rates, travel speeds, and a host of weld specifications that may be downloaded to the enterprise and/or the welding system for use and executing the desired welds. At step 138, then, this data is transmitted to the welding system or enterprise for use and executing the desired production.

In certain presently contemplated scenarios of this type, the provision of drawings and weld specifications may be tied to design or revision processes. Determination of weld specifications may thus be partially or fully automated, along with adaptation of weld processes (e.g., waveforms for pulsed welding), suggested changes to parts or welds to facilitate processing, and so forth. Such activities may be provided free or as a paid service (e.g., per use or by subscription).

Figure 9:
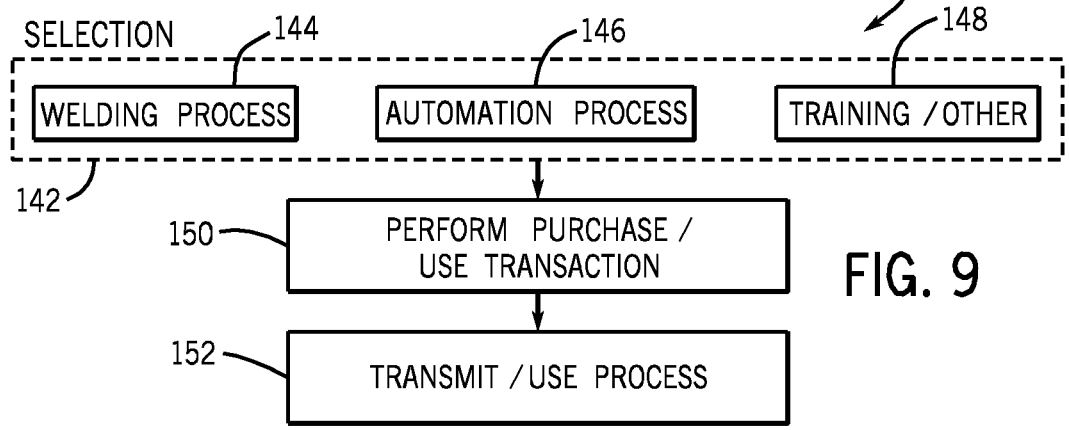
FIG. 9 is a flow chart illustrating exemplary logic for purchasing or renting transactions designed to assist in welding processes through cloud-based resources.

As mentioned above, the present disclosure also contemplates transactions that are enabled by cloud-based resources directly to a welding system or to an enterprise using one or more welding systems. In general, such transactions, designated generally by reference numeral 140 in FIG. 9 will begin with some selection of a product or service as indicated by block 142. In the illustrated embodiment, for example, the user or enterprise may select a welding process 144 that is needed on a permanent or interim basis, as well as various automation processes 146. Many other products and services may be offered, such as training programs, as indicated by reference numeral 148. It is contemplated that the cloud-based resources may provide these from a single source or from many sources. For example, research institutions, universities, or even individuals may offer products via the cloud that can be browsed, selected, purchased, licensed or otherwise utilized (including on cost-free basis) by welders and enterprises. Once a selection is made a purchase or use transaction is performed as indicated by step 150. These transactions may take any conventional form, including prompting users or enterprises to input account information, accept terms of purchase or use, specify purchase versus license details, and so forth. Finally, at step 152 the desired product or service is transmitted to the welder or the welding enterprise for use.

Many different scenarios may be envisaged and are enabled by the present techniques. For example, transactions between welding systems, enterprises employing such systems, and cloud-based resources may be performed on a free-of-charge basis, on an enterprise or hosted basis (e.g., data exchange, storage, supply, etc. being hosted by a welding resource provider), and on a wholly or partially internal basis (e.g., utilizing wending and enterprise resources and cloud-based resources wholly owned and/or controlled by an enterprise). Similar to the scenarios discussed above, for example, welding processes that are now owned or licensed by an enterprise or welding system, but that are needed on a temporary basis may be subject to subscription, such as on a daily, weekly or monthly basis. Further, certain services, such as troubleshooting, maintenance, and so forth may be based upon free (e.g., warranty) or paid bases, with the services being offered and performed via cloud-based resources. Such activities may extend to welding training, performance monitoring, and so forth. Other possible used of the cloud-based resources might include, for example, establishment of quality metrics (e.g., torch angle, stickout, spatter), temporary remote control of a welding process, monitoring and goal setting of performance parameters, such as "weld-on time", and so forth.

While only certain features of the disclosure have been illustrated and described herein, many modifications and changes will occur to those skilled in the art. It is, therefore, to be understood that the appended claims are intended to cover all such modifications and changes.

The invention claimed is:

1. A method comprising:
   receiving, via communication circuitry of a cloud-based resource, welding data relating to a welding operation from a first customer;
   storing the welding data in computer-readable storage media associated with the cloud-based resource;
   offering the welding data for sale, via the cloud based resource;
   receiving, via the communication circuitry, an offer for the welding data from a second customer, different from the first customer, wherein the first and second customers are individual welders, factories, distributed manufacturing operations, or a combination thereof;
   performing a financial transaction with the second customer;
   transmitting, via the communication circuitry, the welding data to the second customer, wherein the welding data defines aspects of at least one welding operation for execution by a welding system by at least specifying one or more welding parameters; and
   subsequently receiving, from the second customer, at least one of weld data or production data associated with the welding system during the welding operation.

2. The method of claim 1, wherein the welding data comprises at least one of a welding process, a definition, a part specification, a welding current, a welding voltage, a welding operator, a workpiece identification, a time of the welding operation and a location of the welding operation.

3. The method of claim 1, wherein the welding data comprises weld training data.

4. The method of claim 1, wherein the financial transaction comprises a purchase of the welding data.

5. The method of claim 1, wherein the financial transaction comprises a time-based license transaction or a use-based license transaction.

6. The method of claim 1, wherein the cloud-based resource is configured to allow the first customer to build one or more libraries of welding data that are stored in the computer-readable storage media associated with the cloud-based resource.

7. The method of claim 6, wherein the first customer controls access by the second customer to the library built by the first customer.

8. The method of claim 6, wherein each library of the one or more libraries comprises commonly used or favorite welding processes.

9. The method of claim 1, wherein the cloud-based resource is configured to receive a modified CAD file from the first customer, and to modify the weld parameters corresponding to the modified CAD file.

10. A method comprising:
    receiving, via communication circuitry of a cloud-based resource, an offer to sell welding data relating to a welding operation from a first customer;
    storing the offer to sell welding data in computer-readable storage media associated with the cloud-based resource;
    offering the welding data for sale, via the cloud based resource;
    receiving, via the communication circuitry, an offer to purchase the welding data from a second customer, different from the first customer, wherein the first and second customers are individual welders, factories, distributed manufacturing operations, or a combination thereof;

facilitating a financial transaction between the first and the second customer for the welding data;

facilitating a transmission of the welding data between the first and the second customer wherein the welding data defines aspects of at least one welding operation for execution by a welding system by at least specifying one or more welding parameters; and subsequently facilitating receiving, from the second customer, at least one of weld data or production data associated with the welding system during the welding operation.

11. The method of claim 10, wherein the welding data comprises at least one of a welding process, a definition, a part specification, a welding current, a welding voltage, a welding operator, a workpiece identification, a time of the welding operation and a location of the welding operation.

12. The method of claim 10, wherein the welding data comprises weld training data.

13. The method of claim 10, wherein the cloud-based resource is configured to allow the first customer to build one or more libraries of welding data that are stored in the computer-readable storage media associated with the cloud-based resource.

14. The method of claim 13, wherein the first customer controls access by the second customer to the library built by the first customer.

15. The method of claim 13, wherein each library of the one or more libraries comprises commonly used or favorite welding processes.

16. A method for execution via a system of one or more networked computing devices, comprising:

transmitting, via communications circuitry of the one or more networked computing devices, at least one product or service offered by a first enterprise or individual via a cloud-based resource, wherein the at least one product or service comprises a definition of a welding process;

processing, via processing circuitry of the one or more networked computing devices, a financial transaction for payment to the first enterprise or individual by a second enterprise or individual, for the at least one product or service;

facilitating, via the communications circuitry of the one or more networked computing devices, transmission of data relating to the at least one product or service from the first enterprise or individual to a welding system associated with the second enterprise or individual;

receiving, via the communications circuitry of the one or more networked computing devices, at least one of weld data or production data associated with the welding system during the welding process; and associating, via the processing circuitry of the one or more networked computing devices, the weld data or production data with the at least one product or service.

17. The method as defined in claim 16, wherein the associating of the weld data or the production data associated with the at least one product or service comprises at least one of: evaluating a performance associated with the weld data or the production data, tracking a weld quality associated with the product or service, adjusting a specification, adjusting a welding parameter, or determining a financial or cost performance.

18. The method as defined in claim 16, wherein the facilitating of the transmission of data relating to the at least one product or service comprises transmitting the data relating to the at least one product or service from the one or more networked computing devices.

19. The method as defined in claim 16, wherein the data relating to the product or service comprises at least one of: specifications for a weld to be performed using the welding system, or welding training data.

* * * * *